United States Patent
Goetsch

(10) Patent No.: US 9,235,493 B2
(45) Date of Patent: Jan. 12, 2016

(54) SYSTEM AND METHOD FOR PEER-BASED CODE QUALITY ANALYSIS REPORTING

(71) Applicant: Oracle International Corporation, Redwood Shores, CA (US)

(72) Inventor: Kelly Goetsch, Chicago, IL (US)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 13/691,558

(22) Filed: Nov. 30, 2012

(65) Prior Publication Data

US 2014/0157239 A1  Jun. 5, 2014

(51) Int. Cl.
| | |
|---|---|
| *G06F 9/44* | (2006.01) |
| *G06F 9/45* | (2006.01) |
| *G06F 11/00* | (2006.01) |
| *G06F 12/14* | (2006.01) |
| *G06F 12/16* | (2006.01) |
| *H04L 29/06* | (2006.01) |
| *G06F 11/36* | (2006.01) |

(52) U.S. Cl.
CPC .................................. *G06F 11/3604* (2013.01)

(58) Field of Classification Search
CPC ... G06F 11/3604; G06F 11/3616; G06F 8/33; G06F 8/36; G06F 8/71; G06F 8/73; G06F 11/3672; G06F 11/3676; G06F 11/3612; G06F 11/32; G06F 11/3495; G06F 17/30398; G06F 8/77; G06F 11/3414; G06F 11/3419; G06F 11/3452; G06F 21/554; G06F 21/56; G06F 21/606; G06F 21/6209; G06F 8/75; G06Q 30/02

See application file for complete search history.

(56) References Cited

U.S. PATENT DOCUMENTS

| | | | | |
|---|---|---|---|---|
| 5,860,011 | A  * | 1/1999 | Kolawa et al. | 717/142 |
| 6,473,896 | B1 * | 10/2002 | Hicken et al. | 717/132 |
| 7,496,889 | B2 * | 2/2009 | Sutter et al. | 717/106 |
| 7,934,248 | B1 * | 4/2011 | Yehuda et al. | 726/1 |
| 8,336,030 | B1 * | 12/2012 | Boissy | 717/126 |
| 8,640,234 | B2 * | 1/2014 | Gassen et al. | 726/23 |
| 8,682,701 | B1 * | 3/2014 | Knauth et al. | 717/101 |
| 8,924,928 | B1 * | 12/2014 | Belovich | 717/117 |
| 2002/0016717 | A1 * | 2/2002 | Ponzio, Jr. | 705/1 |
| 2005/0114840 | A1 * | 5/2005 | Zeidman | 717/126 |

(Continued)

OTHER PUBLICATIONS

Daniela Steidl, Quality Analysis and Assessment of Source code Comments, Sep. 20, 2012, [Retrieved on Dec. 9, 2014]. Retrieved from the internet: <URL: https://www.cqse.eu/publications/2012-quality-analysis-and-assessment-of-source-code-comments.pdf> 111 Pages (1-103).*

(Continued)

*Primary Examiner* — Don Wong
*Assistant Examiner* — Anibal Rivera
(74) *Attorney, Agent, or Firm* — Kilpatrick Townsend & Stockton LLP

(57) ABSTRACT

Systems and methods for peer-based code quality analysis reporting are provided. In accordance with an embodiment, a system can include a peer-based code quality analysis tool, executing on a computer, which is configured to receive one or more source code files, and perform an analysis of the one or more source code files based on a plurality of rules. The peer-based code quality analysis tool can further compare results of the analysis to peer results data to determine a percentile based score, and create an interactive report which includes the results of the analysis and the percentile based score.

18 Claims, 11 Drawing Sheets

(56) References Cited

U.S. PATENT DOCUMENTS

| | | | |
|---|---|---|---|
| 2007/0168959 A1* | 7/2007 | Bayari et al. | 717/120 |
| 2007/0283325 A1* | 12/2007 | Kumar et al. | 717/122 |
| 2008/0148245 A1* | 6/2008 | Gutz | 717/141 |
| 2008/0320457 A1* | 12/2008 | King et al. | 717/146 |
| 2009/0070734 A1* | 3/2009 | Dixon et al. | 717/102 |
| 2009/0094580 A1* | 4/2009 | Bank et al. | 717/123 |
| 2010/0058473 A1* | 3/2010 | Breitenbacher | 726/23 |
| 2010/0333069 A1* | 12/2010 | Chandra et al. | 717/126 |
| 2011/0022551 A1* | 1/2011 | Dixon | 717/131 |
| 2011/0055798 A1* | 3/2011 | Kraft et al. | 717/100 |
| 2011/0067009 A1* | 3/2011 | Hosokawa et al. | 717/132 |
| 2011/0246968 A1* | 10/2011 | Zhang et al. | 717/125 |
| 2012/0260230 A1* | 10/2012 | Choudhary et al. | 717/105 |
| 2012/0272220 A1* | 10/2012 | Calcagno et al. | 717/125 |
| 2012/0291018 A1* | 11/2012 | Peri | 717/126 |
| 2012/0311535 A1* | 12/2012 | Fanning et al. | 717/123 |
| 2013/0074038 A1* | 3/2013 | Fox et al. | 717/122 |
| 2013/0152046 A1* | 6/2013 | Salecker et al. | 717/122 |
| 2014/0123110 A1* | 5/2014 | Wan et al. | 717/124 |
| 2014/0137072 A1* | 5/2014 | Hey et al. | 717/101 |

OTHER PUBLICATIONS

Atollic White paper, Improving software quality with static source code analysis, Jul. 2011, [Retrieved on Dec. 9, 2014]. Retrieved from the internet: <URL: http://www.atollic.com/download/Atollic_Static_Code_Analysis_whitepaper.pdf> 16 Pages (1-12).*

* cited by examiner

Code Quality 360 Report

Report: Executive Summary
Project: CRS 10
Module: Everything
Branch: Trunk
Date: 05/07/2011

- ▲ Executive Summary
- ▲ Compliance
- ▲ Technical Summary
- ▲ CSV Export
- ▲ Individual Issues *(by class)*
- ▲ Individual Issues *(by issue)*
- ▲ Duplicated Code

Executive Summary » 202

| | Value | Grade | |
|---|---|---|---|
| Critical/high priority issues per 100 lines of code | 0.71 | B | 🔍 |
| Issues per 100 lines of code | 5.67 | B | 🔍 |
| Number of comments per 100 lines of code | 11.38 | A | 🔍 |
| Comment characters (% of total characters) | 41.85 | A | 🔍 |
| Java classes that have too many lines of code (% of total classes) | 1.18 | C | 🔍 |
| Java methods that have too many lines of code (% of total methods) | 0 | A | 🔍 |
| Java methods that are too complicated (% of total methods) | 0.05 | B | 🔍 |
| Code that's been copied/pasted (% of total lines of code) | 0.75 | A | 🔍 |

Metrics » 204

| | Value |
|---|---|
| Lines of actual code | 12,960 |
| Number of Java classes | 169 |
| Number of Java methods | 1,931 |
| Average number of methods per Java class | 11.43 |
| Average line count per Java class | 76.69 |
| Average line count per Java method | 6.71 |

*FIG. 2*

| Issue Summary » 302 | # 304 | % 306 | /100 308 | Grade 310 | |
|---|---|---|---|---|---|
| ⊙ Critical priority issues Change absolutely required. Behavior is critically broken/buggy. | 20 | 2.72% | 0.15 | C | ⚲ |
| ⚞ High priority issues Change highly recommended. Behavior is quite likely to be broken/buggy. | 72 | 9.8% | 0.56 | B | ⚲ |
| △ Medium priority issues Change recommended. Behavior is confusing, perhaps buggy, and/or against standards/best practices. | 286 | 38.91% | 2.21 | C | ⚲ |
| ▽ Low priority issues Change optional. Behavior is not likely to be buggy, but more just flies in the face of standards/style/good taste. | 115 | 15.65% | 0.89 | B | ⚲ |
| ⓘ Minor priority issues Change highly optional. Nice to have, such as a consistent naming policy for package/class/fields. | 242 | 32.93% | 1.87 | B | ⚲ |

Export Executive Summary to CSV  [CSV] [Select One ▼]

| Measure » 402 | Grade | Value | |
|---|---|---|---|
| High priority issues per 100 lines of code | B | 0.56 | 🔍 |
| Critical priority issues per 100 lines of code | C | 0.15 | 🔍 |
| Issues per 100 lines of code | B | 5.67 | 🔍 |
| Critical/high priority issues per 100 lines of code | B | 0.71 | 🔍 |
| Number of comments per 100 lines of code | A | 11.38 | 🔍 |
| Comment characters (% of total characters) | A | 41.85 | 🔍 |
| Code that's been copied/pasted (% of total lines of code) | A | 0.75 | 🔍 |

*FIG. 4*

| Technical Summary » 502 | Value | Grade |
|---|---|---|
| Violations per 100 lines of code (non-commenting source code) | 5.67 | B |
| PMD priority 1/2 violations per 100 lines of code (non-commenting source code) | 0.71 | B |
| Comment characters (% of total characters) | 41.85 | A |
| Java classes that are too long (% of total classes) | 1.18 | C |
| Java methods that are too long (% of total methods) | 0 | A |
| Java methods that are too complicated (% of total methods) | 0.05 | B |

506 → Value column; 508 → Grade column

| Metrics » 504 | Value |
|---|---|
| Lines of code (non-commenting source code) | 12,960 |
| Lines of code (raw source code) | 46,185 |
| Number of characters (raw source code) | 1,187,662 |
| Number of Java files | 158 |
| Number of Java classes | 169 |
| Number of Java methods | 1,931 |
| Average number of methods per Java class | 11.43 |
| Average line count per Java class (non-commenting source code) | 76.69 |
| Average line count per Java class (raw source code) | 273.28 |
| Average line count per Java method (non-commenting source code) | 6.71 |
| Average line count per Java method (raw source code) | 23.92 |

| Issue Summary » 602 | # | % | /100 | Grade | |
|---|---|---|---|---|---|
| ⊙ Critical priority issues<br>*Change absolutely required. Behavior is critically broken/buggy.* | 20 | 2.72% | 0.15 | C | 🔍 |
| ⚠ High priority issues<br>*Change highly recommended. Behavior is quite likely to be broken/buggy.* | 72 | 9.8% | 0.56 | B | 🔍 |
| △ Medium priority issues<br>*Change recommended. Behavior is confusing, perhaps buggy, and/or against standards/best practices.* | 286 | 38.91% | 2.21 | C | 🔍 |
| ▽ Low priority issues<br>*Change optional. Behavior is not likely to be buggy, but more just flies in the face of standards/style/good taste.* | 115 | 15.65% | 0.89 | B | 🔍 |
| ⓘ Minor priority issues<br>*Change highly optional. Nice to have, such as a consistent naming policy for package/class/fields.* | 242 | 32.93% | 1.87 | B | 🔍 |

| Issue Details » 604 | Value |
|---|---|
| PMD violation count | 735 |
| PMD violations per 100 lines of code (raw source code) | 1.59 |
| Number of duplicated blocks of code | 7 |
| Number of duplicated lines of code | 347 |
| Code that's duplicated (% of total lines of code) | 0.75 |
| Java classes that are too long (non-commenting source code) | 2 |
| Java classes that are too long (% of total classes) | 1.18 |
| Java methods that are too long (non-commenting source code) | 0 |
| Java methods that are too long (% of total methods) | 0 |
| Java methods that are too complicated (cyclomatic complexity) | 1 |
| Java methods that are too complicated (% of total methods) | 0.05 |
| PMD priority 1 violations per 100 lines of code (raw source code) | 0.04 |
| Violations per 100 lines of code (raw source code) | 0.16 |
| PMD priority 3 violations per 100 lines of code (raw source code) | 0.62 |
| PMD priority 4 violations per 100 lines of code (raw source code) | 0.25 |
| PMD priority 5 violations per 100 lines of code (raw source code) | 0.52 |
| PMD priority 1/2/3 violations per 100 lines of code (raw source code) | 0.82 |
| PMD priority 1/2/3 violations per 100 lines of code (non-commenting source code) | 2.92 |

*FIG. 6*

| Comments » 702 | Value |
|---|---|
| Number of JavaDoc comments | 1,980 |
| Average JavaDoc comments per Java class | 11.72 |
| Average JavaDoc comments per Java method | 1.03 |
| Average JavaDoc comments per Java class +Java method | 0.94 |
| Number of comments per 100 lines of code (non-commenting source code) | 40.56 |
| Number of comments per 100 lines of code (raw source code) | 11.38 |
| Number of single-line comments | 2,191 |
| Average single-line comments per Java method | 1.13 |
| Average single-line comments per Java class | 12.96 |
| Number of multi-line comments | 3,065 |
| Average multi-line comments per Java method | 1.59 |
| Average multi-line comments per Java class | 18.14 |
| Average number of comments per Java method (single+multi-line) | 2.72 |
| Average number of comments per Java class (single+multi-line) | 31.1 |
| Number of single-line comment characters | 100,897 |
| Number of single-line comment words | 11,453 |
| Number of multi-line comment characters | 396,096 |
| Number of multi-line comment words | 64,500 |
| Number of comment characters | 496,993 |
| Average number of words per single-line comment | 5.23 |
| Average number of words per multi-line comment | 21.04 |
| Average number of comment words per Java class | 449.43 |

*FIG. 7*

Summary of violations per class

Select One (violations/class in descending order) ▶

800

802

Store/EStore/src/atg/projects/store/catalog/StoreCatalogTools.java
11 total violation(s). (P1=0, P2=0, P3=4, P4=0, P5=7)

| Line(s) 804 | Priority 806 | Rule 808 | Description 810 |
|---|---|---|---|
| 46 | 3 | SuspiciousConstantFieldName | The field name indicates a constant but its modifiers do not |
| 69 | 3 | LooseCoupling | Avoid using implementation types like "LinkedHashMap", use the interface instead |
| 75 | 3 | LooseCoupling | Avoid using implementation types like "LinkedHashMap", use the interface instead |
| 83 | 3 | LooseCoupling | Avoid using implementation types like "LinkedHashMap", use the interface instead |
| 25 | 5 | UnusedImports | Avoid unused imports such as "atg.nucleus.ServiceException" |
| 153-155 | 5 | CollapsibleIfStatements | These nested if statements could be combined |
| 182 | 5 | UseCollectionIsEmpty | Substitute calls to size( ) == 0 (or size( ) !=0) with calls to isEmpty( ) |
| 221 | 5 | UseCollectionIsEmpty | Substitute calls to size( ) == 0 (or size( ) !=0) with calls to isEmpty( ) |
| 275 | 5 | UseCollectionIsEmpty | Substitute calls to size( ) == 0 (or size( ) !=0) with calls to isEmpty( ) |
| 313 | 5 | UseCollectionIsEmpty | Substitute calls to size( ) == 0 (or size( ) !=0) with calls to isEmpty( ) |
| 347 | 5 | UseCollectionIsEmpty | Substitute calls to size( ) == 0 (or size( ) !=0) with calls to isEmpty( ) |

*FIG. 8*

SYSTEM AND METHOD FOR PEER-BASED CODE QUALITY ANALYSIS REPORTING

REFERENCE TO A "SEQUENCE LISTING," A TABLE, OR A COMPUTER PROGRAM LISTING APPENDIX

A computer program listing appendix, named Appendix-A.txt, is filed herewith as an ASCII text file which was created on Nov. 30, 2012 and is 38467 bytes in size. The material included in AppendixA.txt is herein incorporated by reference for all purposes.

BACKGROUND

When companies acquire a new software application, they typically work with a vendor or systems integrator to incorporate that software application with the rest of the company's IT system. The quality of code implementations received from the systems integrator can vary widely, and so to ensure that they are receiving quality code, companies will often turn to code quality consultants to evaluate and recommend changes to their implementation. Code quality analysis can be performed manually or using a number of different analysis tools.

Code quality analysis tools provide a way for companies to analyze the quality of computer code they receive from their systems integrators. These tools can include static code quality analysis tools, which analyze code without executing it, and dynamic code quality analysis tools which analyze code at runtime. These tools can check for possible coding errors, inefficiencies, and other metrics based on a particular company's best practices or quality standards.

When a user runs one particular standard code quality analysis tool, the output provided is typically given in absolute values. For example, the tool will create a report that indicates there are 750 issues identified in the code. However, absolute values such as these are of limited use when evaluating the quality of a particular code implementation. In other words, absolute values alone, without context, do not indicate whether, for example, code having 750 issues is an example of good coding or bad coding.

Additionally, not all available code analysis quality tools provide the same quality checks. Therefore, to get a more comprehensive analysis of the quality of a given code project, multiple tools typically need to be separately utilized.

SUMMARY

In accordance with an embodiment, a peer-based code quality analysis tool can be utilized to comprehensively analyze code quality and contextualize the results. Like previous code quality analysis tools, the peer-based code quality analysis tool can provide absolute values (e.g. 892 code issues). However, unlike previous tools, it can also contextualize and normalize these absolute results based on results from similar code implementations. Context can be provided by analyzing code implementations of the same product, for example Oracle ATG, used by different companies. For example, results can be provided using percentile-based grading, so that $90^{th}$ percentile to $100^{th}$ percentile is an "A," the $70^{th}$ percentile to $90^{th}$ percentile is a "B," and so on. This allows for companies to hold their systems integrators accountable to specific, measurable standards, which yield improved code implementations.

Systems and methods for peer-based code quality analysis reporting are provided. In accordance with an embodiment, a system can include a peer-based code quality analysis tool, executing on a computer, which is configured to receive one or more source code files, and perform an analysis of the one or more source code files based on a plurality of rules. The peer-based code quality analysis tool can further compare results of the analysis to peer results data to determine a percentile based score, and create an interactive report which includes the results of the analysis and the percentile based score.

BRIEF DESCRIPTION OF THE DRAWINGS

A further understanding of the nature and advantages of various embodiments may be realized by reference to the following figures. In the appended figures, similar components or features may have the same reference label.

FIG. 2 illustrates an interactive code quality report summary, in accordance with an embodiment.

FIG. 3 illustrates an interactive code quality report issue summary, in accordance with an embodiment.

FIG. 4 illustrates a compliance report, in accordance with an embodiment.

FIG. 5 illustrates an interactive code quality report technical summary, in accordance with an embodiment.

FIG. 6 illustrates an interactive code quality report technical issue summary, in accordance with an embodiment.

FIG. 7 illustrates an interactive code quality report technical comment quality summary, in accordance with an embodiment.

FIG. 8 illustrates an interactive code quality report including issue details selectable by class, in accordance with an embodiment.

DETAILED DESCRIPTION

In accordance with an embodiment, a peer-based code quality analysis tool can be utilized to comprehensively analyze code quality and contextualize code quality analysis results. In addition to absolute results, embodiments of the present invention can contextualize and normalize the absolute results based on results from similar code implementations. Context can be provided by analyzing code implementations of the same product, for example Siebel CRM, used by different companies. For example, results can be provided using percentile-based grading, so that $90^{th}$ percentile to $100^{th}$ percentile is an "A," the $70^{th}$ percentile to $90^{th}$ percentile is a "B," and so on. This allows for companies to hold their systems integrators accountable to specific, measurable standards, which yields improved code implementations.

Code quality consultants may have access to source code implementations of a given software product from a plurality of different companies. By analyzing each implementation in the same manner, using the same tools, the results of the different implementations can be fit to a grading curve. When a new implementation is analyzed, its results can be graded on the curve established by its peers' implementations. This provides context for quality results for each code base, relative to peer-implementations.

Additionally, in accordance with an embodiment, the peer-based quality analysis tool can incorporate a plurality of different code quality analysis tools, integrating quality checks associated with a plurality of different metrics into the resulting quality report. These different code quality tools can include commonly available tools like PMD and Checkstyle. These tools can check for code errors and inefficiencies, based on customizable rules, as well as ensure that the code conforms to style standards to improve, for example, readability and reusability. The peer-based quality analysis tool can also include custom tools, such as a code commenting tool, which can analyze a number of comment characters and determine the quality of the comments. The code comment tool can determine how many comment characters there are compared to noncomment characters, the number of comments, and the distribution of comments throughout the code. Comment quality can then be graded based on these metrics.

This integration allows quality standards and a report of compliance with those standards to created and displayed. Further, the output of the tool can include reports for each sub-module of a particular code project. This degree of granularity can enable either the company or the systems integrator to focus quality control attentions on particular development teams which may not be achieving the required quality standards. Additionally, by integrating a plurality of analysis tools, redundant manual analysis can be reduced, saving both time and processing requirements.

Figure 1:
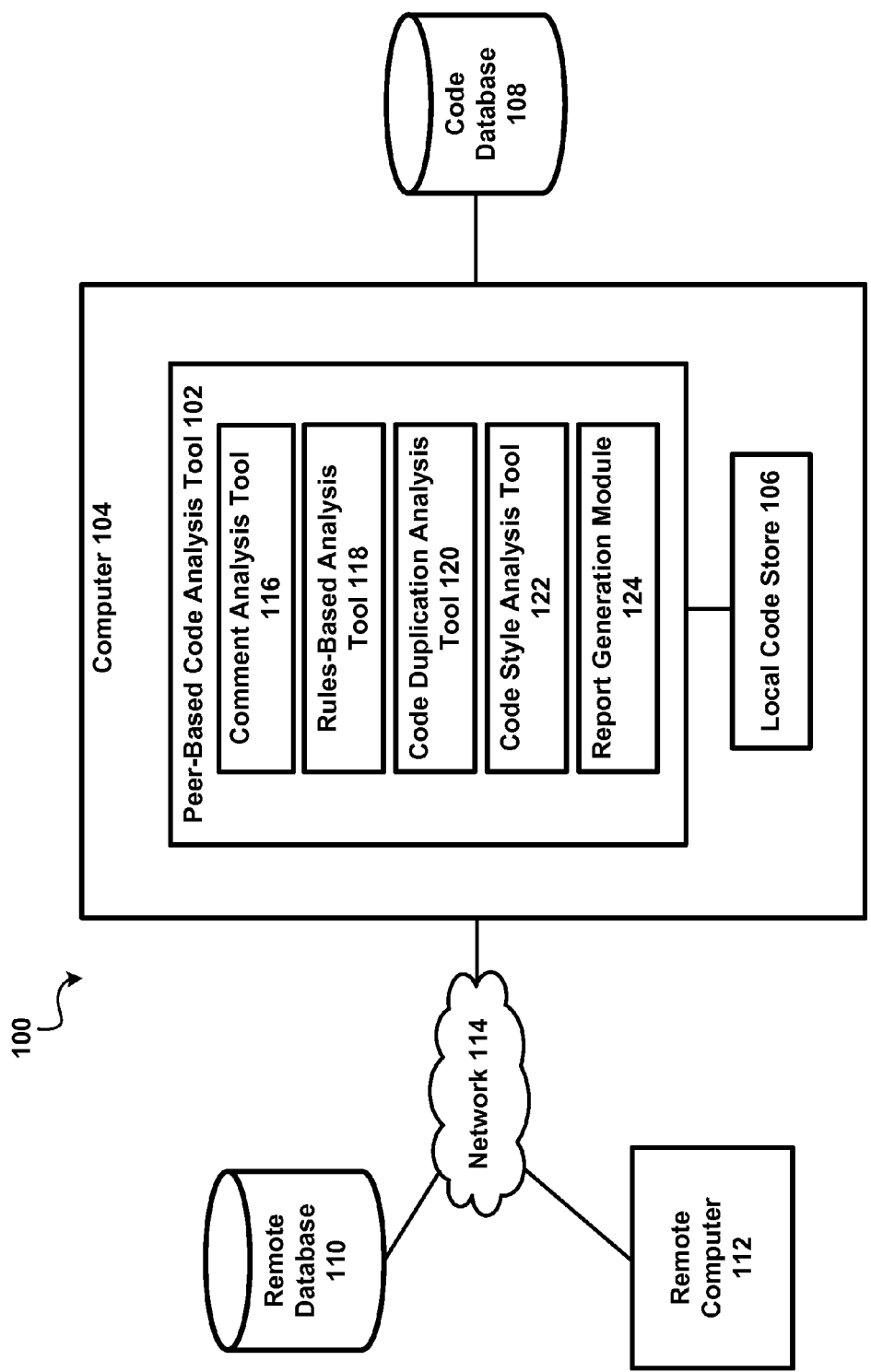
FIG. 1 illustrates a system for peer-based code quality analysis, in accordance with an embodiment.

FIG. 1 illustrates a system for peer-based code quality analysis 100, in accordance with an embodiment. As shown in FIG. 1, the system can include a peer-based code quality analysis tool 102, executing on a computer 104. The peer-based code quality analysis tool 102 can be used to analyze source code and provide an interactive report which details issues with the source code. In accordance with an embodiment, the peer-based quality analysis tool can be used to analyze source code written in a plurality of different languages, such as Java. The interactive report can also include a percentile based score which indicates the relative quality of the analyzed source code compared to similar code implementations. The source code files can be stored locally on the computer 104 in a local code store 106 or code database 108 connected to the computer 104. Additionally, the source code can be received from remote sources, such as remote database 110 or remote computer 112, over network 114.

In accordance with an embodiment, the peer-based code quality analysis tool can comprise a plurality of different code quality analysis tools. For example, as shown in FIG. 1, a comment analysis tool 116 can be used to analyze the quality of comments included in the source code. Commenting code is generally included as a best practices requirement which improves the readability and reusability of code. However, depending on how code comments are evaluated, commenting requirements can be easy to exploit by developers.

In accordance with an embodiment, the comment analysis tool can recursively scan a directory in which the source code files being analyzed are stored. The tool can identify each source code file in the directory and, for each source code file identified, open the source code file and identify comments in the source code file. The comment quality tool can count (1) the number of characters of each line, (2) the number and (3) size of multi-line comments, and (4) the number and (5) size of single-line comments. Additionally, by using a space as a delimiter, the comment quality tool can further determine how many words each comment includes, such as by using a string tokenizer. Using these comment metrics, the peer-based code quality tool can determine and report the quality of the comments in the source code, as is further discussed below.

In accordance with an embodiment, the peer-based code quality analysis tool 102 can further include a rules-based analysis tool 118. The rules-based analysis tool can be any available rules-based code analysis tool such as PMD. The peer-based code quality analysis tool can pass each source code file to the rules-based analysis tool along with a rule set. The rule set can include standard rules provided with the rules-based analysis tool and/or custom rules created for a particular analysis. The rule set can be provided as an XML file which includes both standard and custom rules. An example of custom rules is provided in Appendix A. As shown in Appendix A, these rules can check, for example, that hard coded string values are not passed to checkFormRedirect( ) (see StringLiteralCheckFormRedirect rule) or that *.getMessage( ) is not used in logError( ) (see GetMessageLogError rule). Other custom rules besides those shown in Appendix A may also be written and utilized with embodiments of the present invention.

In accordance with an embodiment, the rules-based analysis tool can generate a data structure based on the source code, such as an abstract syntax tree (AST), using a parser. Each rule in the rule set can then be applied to the data structure. As rule violations are identified, they can be recorded in a file, or other appropriate data structure. Each violation can include the line number or numbers in the code where the violation was identified, the rule that was violated, and a priority associated with the rule. Additionally, a description of the rule violation can also be included. The rules-based analysis tool can then return the file including the recorded rules violations to the peer-based code quality analysis tool.

Additionally, a code duplication analysis tool 120 can be separately included in the peer-based code quality analysis tool 102 or incorporated in the rules-based analysis tool 118. For example, if PMD is used as the rules-based analysis tool 118, a CPD (copy/paste detector) plugin can be used to perform code duplication detection. Alternative code duplication analysis tools may also be used, as are well known to those of ordinary skill in the art. Further, a code style analysis tool 122, such as CheckStyle or other commonly available tools, can also be incorporated into the peer-based code quality analysis tool 102. This can be used to check the source code against a plurality of style rules. For example, the code style analysis tool can check for the number of conditions in a given expression, the style of headers, the use of whitespace, etc. Additionally, custom style rules can also be written for and used by the code style analysis tool 122. As with the rules-based analysis tool, after checking the source code for style, the code style analysis tool can record each style violation in file, or other appropriate data structure, along with a description of the violation, the location of the violation, the style rule violated, and other related information such as a priority, if any, associated with the style rule. Although the rules-based analysis tool 116, code duplication analysis tool 118 and code style analysis tool 120 are shown as logically distinct tools in FIG. 1, one of ordinary skill in the art would recognize that the functionality embodied by these blocks can be incorporated into one or more tools.

The peer-based code quality analysis tool 102 can then use the results of the comment analysis tool 116, rules-based analysis tool 118, code duplication analysis tool 120, and the code style analysis tool 122 to create a report. This can be performed using a report generation module 124 which aggregates the outputs of the other analysis tools and determines a peer-based grade along with objective metrics for the source code under test. The report generation module can also determine additional details about the source code, such as how many lines of code and how many characters, classes, and methods are in the source code. Additionally, the results of each tool can be stored, locally or remotely, to be used in future peer-based analyses.

FIG. 2 illustrates an interactive code quality report summary, in accordance with an embodiment. As shown in FIG. 2, a code quality report 200 can be generated by the peer-based code quality analysis tool 102. The code quality report 200 can include an executive summary 202 and a summary of metrics 204. Additionally, the code quality report can be navigated by selecting one or more links 206 to show additional details of the report. The summary of metrics 204 can include details about the source code which were determined by the report generation module 124, such as lines of code, number of classes, and number of methods 208. From these values, the report generation can determine additional metrics 210, such as average number of methods per class, average line count per class, and average line count per method.

In accordance with an embodiment, the details for each measure 212 in the executive summary 202 can be similarly determined Based on the output of the rules-based analysis tool 118, a number of high priority issues can be determined. The number of high priority issues can then be normalized per 100 lines of code, using the lines of code metric. Similarly, the total number of issues per 100 lines of code can also be determined Using the output of the comment analysis tool 116, and the metrics determined by the report generation module, the number of comments per 100 lines of code and the number of comment characters as a percentage of total characters can be determined Additionally, based on the output of the code style analysis tool, the number of classes with too many lines of code, the number of methods with too many lines of code, the number of methods that are too complicated, and a percentage of duplicated code can also be determined.

As shown in FIG. 2, the values for each of the measures 212 in the executive summary is shown as an objective number in value column 214. These objective measures indicate, for example, the frequency of issues in the code, however it is unclear whether these values represent high code quality or poor code quality. Accordingly, the report generation module can assign a letter grade to each measure 212 in grade column 216. In accordance with an embodiment, the grade for each measure can be determined based on a set of manual grading rules which are predetermined for a particular item (e.g. A:<=6.398, B:<=8.214, C:<=8.737, D:<=9.127, F:>9.127), automatic percentile-based grading rules (e.g. A:>=90%, B:>=70%, C:>=55%, D:>=45%, F:<45%), a flag which indicates whether a higher number or a lower number is preferred for an item (e.g., a lower number is preferred for number of violations, while a higher number is preferred for number of comments), and peer results data which can be used for percentile calculation. Based on all of this, an A-F score for each measure can be calculated. The scores and associated grades for each measure can be stored in a properties file or other appropriate data structure.

In accordance with an embodiment, if the flag is set to true, indicating that a lower value is preferred, the percentiles associated with each letter grade can be reversed. For example, if A>=90%, and the flag is set to true, then the percentile value can be reversed (e.g., by subtracting the percentile value from 100) to yield A>=10%. If automatic grading is used, then the percentiles used can be extracted from the percentile-based grading rules, and threshold values can be calculated for these percentiles in the peer results data. The grade for a given measure can then be determined by comparing the value of the measure to the calculated threshold values. If manual grading is used, then the objective measure can be compared directly to the values in the manual grading rules to assign that measure's grade.

FIG. 3 illustrates an interactive code quality report issue summary, in accordance with an embodiment. In accordance with an embodiment, as shown in FIG. 3, the interactive code quality report summary can further include an issue summary 300. As described above, each rule can be associated with a priority. In the issue summary 300, a summary of each priority level can be presented. The issue summary can include a description of each priority level 302 and the number of violations associated with each level 304. Additionally, the number of violations as a percentage of total violations 306 and frequency of violations per 100 lines of code 308 can also be shown. These can each be determined based on the metrics shown in FIG. 2 and the output of at least the rules-based analysis tool 118 and code style analysis tool 122.

In accordance with an embodiment, a letter grade can also be associated with each priority level, as shown at column 310. As described above, these letter grades can be determined using hard coded threshold values (manual grading) or using percentile values based on peer results data. Additionally, a copy of the summary can be exported 312 in one or more formats such as comma separated values (CSV).

FIG. 4 illustrates a compliance report, in accordance with an embodiment. A contract between a company and its systems integrator can require a particular letter grade for one or more measures to determine that the contract has been fulfilled. These custom measures can be represented in a compliance report 400. The compliance report can include the one or more measures 402 and each measure's associated grade 404, determined as described above, and objective value 406.

FIG. 5 illustrates an interactive code quality report technical summary, in accordance with an embodiment. A technical summary 500 can present additional code quality details not shown in the executive summary. This can include measures 502, which can include the same or different measures as shown in the executive summary, and metrics 504. As described above, each measure can include an objective value 506 and a grade 508 determined using peer results data.

FIG. 6 illustrates an interactive code quality report technical issue summary, in accordance with an embodiment. As shown in FIG. 6, the technical summary can further include a technical issue summary 600. This can include an issue summary 602, such as the one shown in the executive summary, and issue details 604. The issue details 604 can include more specific descriptions of issues with the source code that were identified by the peer-based code quality analysis tool. These descriptions can include the frequency of violations of each priority level, more detailed style issues, and a more detailed description of duplicated code.

FIG. 7 illustrates an interactive code quality report technical comment quality summary, in accordance with an embodiment. As shown in FIG. 7, the technical summary can further include a comment quality summary 700. As discussed above, comment quality can be objectively determined using a comment analysis tool. Automated comment quality analysis presents a number of challenges. Typically, comments should be distributed throughout the code to aid in readability and reusability of the code, rather than grouped as a single large comment at the beginning of a class. So merely identifying a number of commented characters may not indicate the quality of the code commenting. Additionally, merely counting the number of comments in a codebase may not provide a clear indication of the quality of the comments, as this can be manipulated by inserting short comments, or comments filled with spaces.

Accordingly, as described above, the comment analysis tool can recursively scan a directory to select each source code file. Each source code file can then be opened and scanned for comments. The comment analysis tool can count the number of characters of each comment line, the number and size of multi-line comments, and the number and size of single-line comments. These values can then be used to determine the quality of the comments by determining a plurality of comment measures 702. The comment analysis tool can determine whether a comment is a single line comment or a multiline comment by identifying the presence of comment delimiters. For example, if a comment is identified as starting with "/*" and "*/" is not identified on the same line, then the comment is determined to be a multiline comment. The comment analysis tool can continue checking subsequent lines until the end comment delimiter is found. Additionally, the comment analysis tool can identify and count the number of specific types of comments, such as JavaDoc comments, by identifying comments beginning with specific delimiters, such as "/**".

For both single line and multiline comments, the comment analysis tool can tokenize each comment, using a space as a delimiter. This can be used to determine the number of words in each comment. Additionally, for each comment, the comment analysis tool can identify each comment and remove any whitespace in the comment. Each comment can then be analyzed to determine whether it is empty. For example, a single line comment of "//" would be left with just "//". The comment analyzer can check for comments that only include "//" and similar strings such as "/**/" or "*//*".

In accordance with an embodiment, the comment metrics determined by the comment analysis tool can be combines with the metrics for the source code determined by the report generation module to generate a number of comment measures 702. These can include, for example, the average number of comments per method and per class. These measures make it more difficult to exploit the commenting guidelines by including dummy comments throughout the code or by providing a single large comment for a method or class.

FIG. 8 illustrates an interactive code quality report including issue details selectable by class, in accordance with an embodiment. As shown in FIG. 8, the issues identified in the interactive code quality report can be navigated by class. The user can make a selection from a menu 800 which includes a list of class files in the project being analyzed. As shown in FIG. 8, the list can be sorted by violations per class, in descending order, however alternative sortings are also possible. When a particular class is selected, the interactive report can display a list of violations associated 802 with that class. In FIG. 8, the class StoreCatalogTools has been selected. This class is associated with 11 violations. Each violation is shown by line 804, priority 806, rule 808 and description 810.

Figure 9:
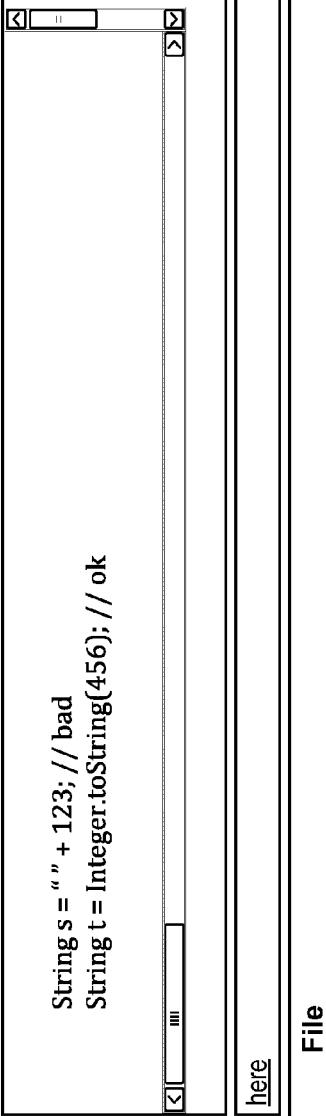
FIG. 9 illustrates an interactive code quality report including issue details selectable by issue priority and frequency, in accordance with an embodiment.

FIG. 9 illustrates an interactive code quality report including issue details selectable by issue priority and frequency, in accordance with an embodiment. Additionally, violations may also be navigated 900 based on priority 902 or frequency 904. Using either the priority 902 or frequency 904 list, a rule can be selected to present a more detailed view 906 of the selected rule. As shown in FIG. 9, the AddEmptyString rule has been selected. The detailed view 906 of AddEmptyString shows the location of violations 908, in this example there was a single violation. Additionally, the detailed view 906 can include the number of violations 910, the rule's priority 912, a message 914 describing the violation, a description 916 describing the rule, and a code example 918 illustrating proper and improper coding.

Figure 10:
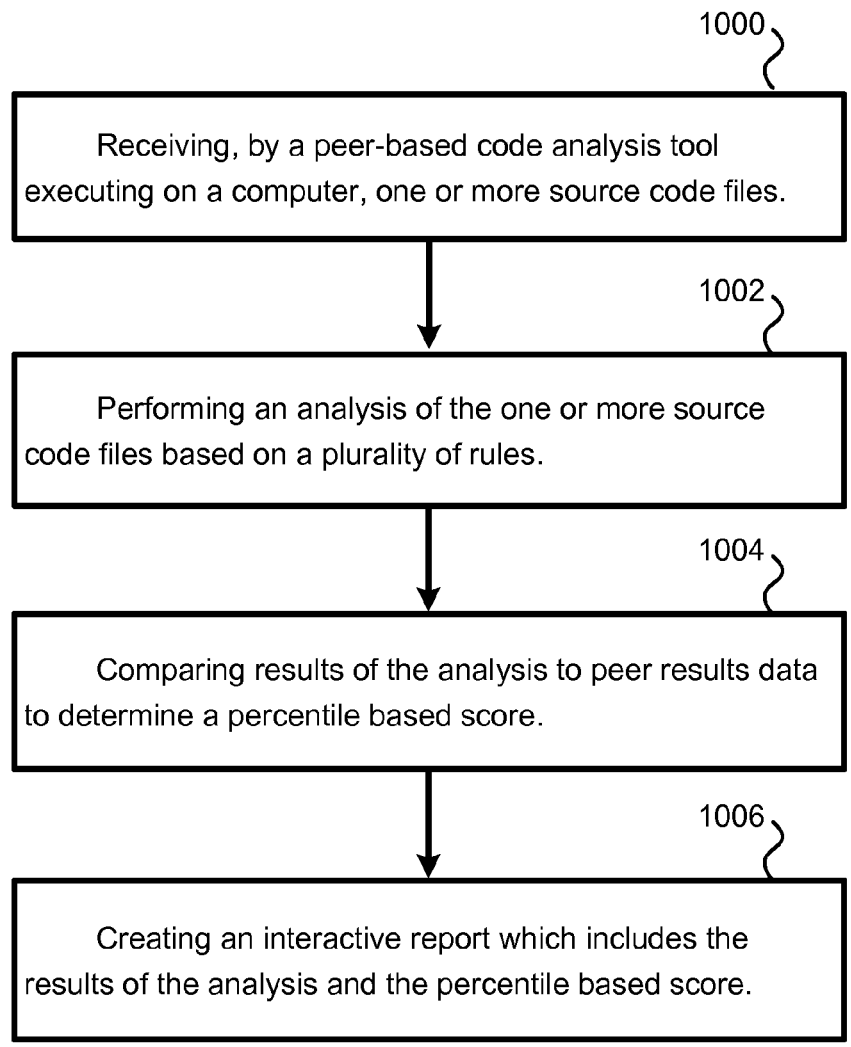
FIG. 10 illustrates an embodiment of a method for peer-based code quality analysis, in accordance with an embodiment.

FIG. 10 illustrates an embodiment of a method for peer-based code quality analysis, in accordance with an embodiment. At step 1000, a peer-based code quality analysis tool executing on a computer, receives one or more source code files. At step 1002, an analysis of the one or more source code files is performed based on a plurality of rules. At step 1004, results of the analysis are compared to peer results data to determine a percentile based score. At step 1006, an interactive report which includes the results of the analysis and the percentile based score is created.

As describe above, the analysis of the one or more source code files can include performing a comment quality analysis, performing a rules-based analysis using the plurality of rules, performing a code style analysis, and performing a duplicate code analysis. The comment quality analysis can include determining a number of single line and multiline comments, determining a number of words in each comment, removing whitespace from each comment, and determining a number of characters in each comment. Additionally, the results of the analysis of the one or more source code files can include a total number of potential code issues, a ratio of a number of rules violations per a number of lines of code, and the comment quality analysis.

Figure 11:
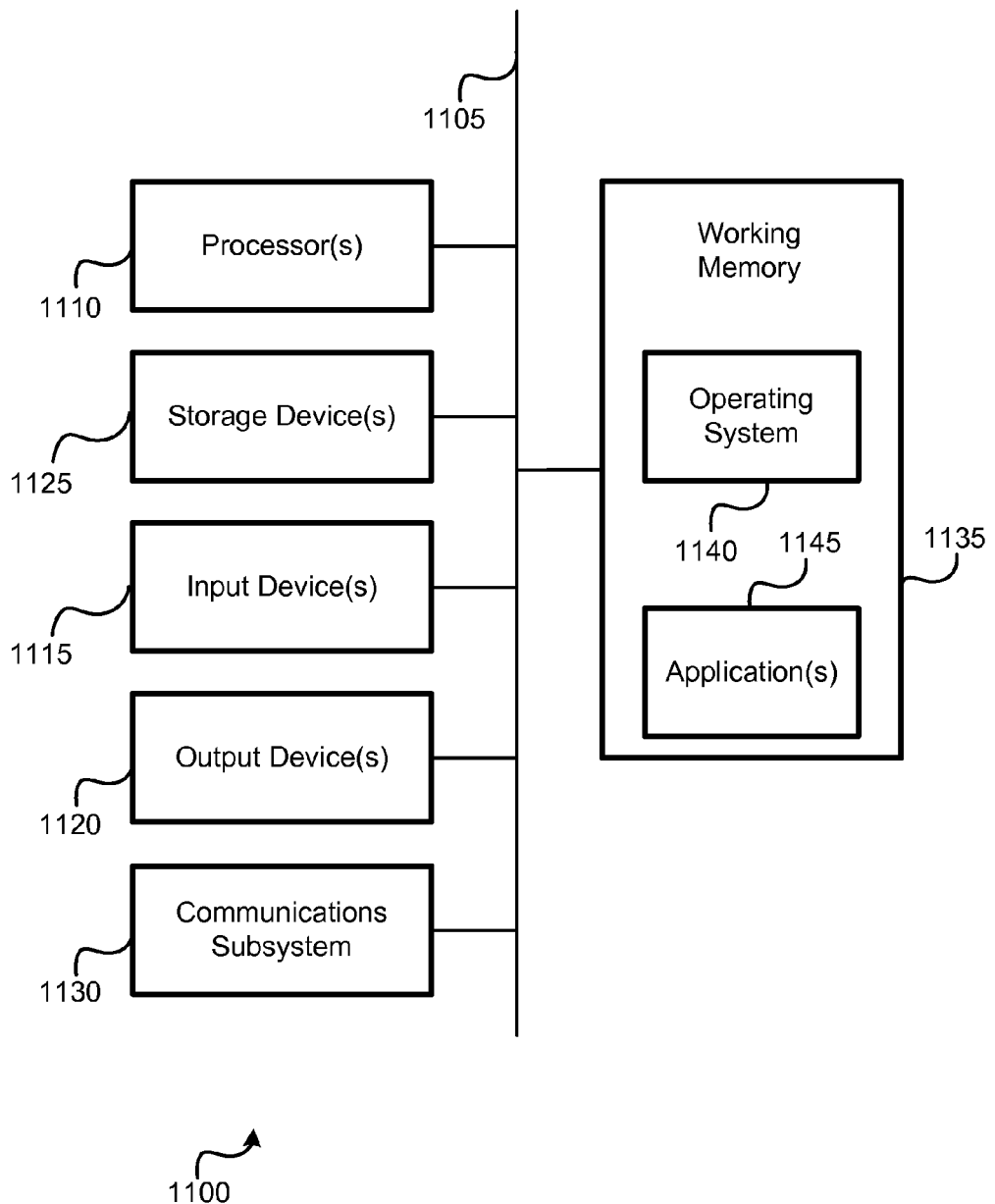
FIG. 11 illustrates an embodiment of a computer system.

FIG. 11 illustrates an embodiment of a computer system. A computer system as illustrated in FIG. 11 may be incorporated as part of the previously described computerized devices. For example, computer system 1100 can represent some of the components of the webservers, the user computer system, and the developer computer systems discussed in this application. FIG. 11 provides a schematic illustration of one embodiment of a computer system 1100 that can perform the methods provided by various embodiments. It should be noted that FIG. 11 is meant only to provide a generalized illustration of various components, any or all of which may be utilized as appropriate. FIG. 11, therefore, broadly illustrates how individual system elements may be implemented in a relatively separated or relatively more integrated manner.

The computer system 1100 is shown comprising hardware elements that can be electrically coupled via a bus 1105 (or may otherwise be in communication, as appropriate). The hardware elements may include one or more processors 1110, including without limitation one or more general-purpose processors and/or one or more special-purpose processors (such as digital signal processing chips, graphics acceleration processors, and/or the like); one or more input devices 1115, which can include without limitation a mouse, a keyboard, and/or the like; and one or more output devices 1120, which can include without limitation a display device, a printer, and/or the like.

The computer system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1100 might also include a communications subsystem 1130, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1130 may permit data to be exchanged with a network (such as the network described below, to name one example), other computer systems, and/or any other devices described herein. In many embodiments, the computer system 1100 will further comprise a working memory 1135, which can include a RAM or ROM device, as described above.

The computer system 1100 also can comprise software elements, shown as being currently located within the working memory 1135, including an operating system 1140, device drivers, executable libraries, and/or other code, such as one or more application programs 1145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1125 described above. In some cases, the storage medium might be incorporated within a computer system, such as computer system 1100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1100 and/or might take the form of source and/or installable code, which, upon compilation and/or installation on the computer system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1100) to perform methods in accordance with various embodiments of the invention. According to a set of embodiments, some or all of the procedures of such methods are performed by the computer system 1100 in response to processor 1110 executing one or more sequences of one or more instructions (which might be incorporated into the operating system 1140 and/or other code, such as an application program 1145) contained in the working memory 1135. Such instructions may be read into the working memory 1135 from another computer-readable medium, such as one or more of the non-transitory storage device(s) 1125. Merely by way of example, execution of the sequences of instructions contained in the working memory 1135 might cause the processor(s) 1110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1100, various computer-readable media might be involved in providing instructions/code to processor(s) 1110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1125. Volatile media include, without limitation, dynamic memory, such as the working memory 1135.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1100.

The communications subsystem 1130 (and/or components thereof) generally will receive signals, and the bus 1105 then might carry the signals (and/or the data, instructions, etc. carried by the signals) to the working memory 1135, from which the processor(s) 1110 retrieves and executes the instructions. The instructions received by the working memory 1135 may optionally be stored on a non-transitory storage device 1125 either before or after execution by the processor(s) 1110.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A system for peer-based code quality analysis, the system comprising:
    a computer, including a non-transitory computer readable medium and processor;
    a peer-based code quality analysis tool, executing on the computer, which is configured to:
       receive one or more source code files, wherein a source code file includes source code,
       perform an analysis of the one or more source code files based
    on a plurality of rules, wherein the analysis the peer-based code analysis tool is configured to perform includes:
       a comment quality analysis of comments, and
       a source code analysis of the source code to detect source code errors or inefficiencies using a rules-based analysis using the plurality of rules, a code style analysis, and a duplicate code analysis,
       compare results of the analysis to peer results data to determine a percentile based score, wherein the peer results data includes analysis of similar implementations of the source
       code by different peer entities, wherein the percentile based score provides an assessment of the source code relative to the similar implementations of the source code by the different peer entities, and
       create an interactive report which includes the results of the analysis and the percentile based score.

2. The system of claim 1 wherein the comment quality analysis includes:
    determining a number of single line and multiline comments;
    determining a number of words in each comment;
    removing whitespace from each comment to determine whether each comment is empty; and
    determining a number of characters in each comment.

3. The system of claim 1 wherein the results of the analysis of the one or more source code files includes a total number of potential code issues, a ratio of a number of rules violations per a number of lines of code, and the comment quality analysis.

4. The system of claim 1 wherein each rule of the plurality of rules is associated with a priority number which indicates a relative importance of that rule.

5. The system of claim 1 wherein the interactive report can include a summary of the results of the analysis and details of each issue identified in the results of the analysis.

6. The system of claim 1 wherein the peer-based code analysis tool is further configured to compare the results of the analysis and the percentile based score with a plurality of compliance metrics.

7. A method for peer-based code quality analysis, the method comprising:
    receiving, by a peer-based code quality analysis tool executing on a computer, one or more source code files;
    performing an analysis of the one or more source code files based on a plurality of rules, wherein performing an analysis of the one or more source code files based on a plurality of rules, comprises:
       performing a comment quality analysis,
       performing a rules-based analysis using the plurality of rules,
       performing a code style analysis, and
       performing a duplicate code analysis;
    comparing results of the analysis to peer results data to determine a percentile based score, wherein the peer results data includes analysis of similar implementations of the source code by different peer entities, wherein the percentile based score provides an assessment of the source code relative to the similar implementations of the source code by the different peer entities; and
    creating an interactive report which includes the results of the analysis and the percentile based score.

8. The method of claim 7 wherein the comment quality analysis includes:
    determining a number of single line and multiline comments;
    determining a number of words in each comment;
    removing whitespace from each comment; and
    determining a number of characters in each comment.

9. The method of claim 7 wherein the results of the analysis of the one or more source code files includes a total number of potential code issues, a ratio of a number of rules violations per a number of lines of code, and the comment quality analysis.

10. The method of claim 7 wherein each rule of the plurality of rules is associated with a priority number which indicates a relative importance of that rule.

11. The method of claim 9 wherein the interactive report can include a summary of the results of the analysis and details of each issue identified in the results of the analysis.

12. The method of claim 7 further comprising comparing the results of the analysis and the percentile based score with a plurality of compliance metrics.

13. A non-transitory computer readable storage medium including instructions stored thereon which, when executed by a processor, cause the processor to perform the steps of:
    receiving, by a peer-based code quality analysis tool executing on a computer, one or more source code files, wherein a source code file includes source code;
    performing an analysis of the one or more source code files based on a plurality of rules, wherein performing an analysis of the one or more source code files based on a plurality of rules, comprises:
       performing a comment quality analysis of comments, and performing a source code analysis of the source code to detect
source code errors or inefficiencies using performing a rules-based analysis utilizing the plurality of rules, performing a code style analysis, and performing a duplicate code analysis;
comparing results of the analysis to peer results data to determine a percentile based score, wherein the peer results data includes analysis of similar implementations of the source code by different peer entities, wherein the percentile based score provides an assessment of the source code relative to the similar implementations of the source code by the different peer entities; and
creating an interactive report which includes the results of the analysis and the percentile based score.

14. The non-transitory computer readable storage medium of claim 13 wherein the comment quality analysis includes:
determining a number of single line and multiline comments;
determining a number of words in each comment;
removing whitespace from each comment; and
determining a number of characters in each comment.

15. The non-transitory computer readable storage medium of claim 13 wherein the results of the analysis of the one or more source code files includes a total number of potential code issues, a ratio of a number of rules violations per a number of lines of code, and the comment quality analysis.

16. The non-transitory computer readable storage medium of claim 15 wherein each rule of the plurality of rules is associated with a priority number which indicates a relative importance of that rule and wherein the interactive report can include a summary of the results of the analysis and details of each issue identified in the results of the analysis.

17. The non-transitory computer readable storage medium of claim 13 further comprising comparing the results of the analysis and the percentile based score with a plurality of compliance metrics.

18. A system for peer-based code quality analysis, the system comprising:
a computer, including a non-transitory computer readable medium and processor;
a peer-based code quality analysis tool, executing on the computer, which is configured to:
receive one or more source code files,
perform an analysis of the one or more source code files based
on a plurality of rules, wherein the analysis the peer-based code analysis tool is configured to perform includes a comment analysis of
comments to determine quality of comments and a source code analysis of the source code to detect source code errors or inefficiencies,
compare results of the analysis to peer results data to determine a percentile based score, wherein the peer results data includes analysis of similar implementations of the source code by different peer entities, wherein the percentile based score provides an
assessment of the source code relative to the similar implementations
of the source code by the different peer entities,
compare the results of the analysis and the percentile based score with a plurality of compliance metrics, and
create an interactive report which includes the results of the analysis and the percentile based score.

\* \* \* \* \*